(12) United States Patent
Peloquin et al.

(10) Patent No.: US 9,238,184 B2
(45) Date of Patent: Jan. 19, 2016

(54) APPARATUS AND METHOD FOR REFINING A PROCESS LIQUOR BY GRAVITY SETTLING

(75) Inventors: Guy Peloquin, Jonquière (CA); Alain Larouche, Jonquière (CA); Alain Boivin, La Baie (CA); Matthieu St-Laurent, Jonquière (CA); Régis Girard, Jonquière (CA); Guy Simard, Chicoutimi (CA)

(73) Assignee: Rio Tinto Alcan International Limited, Montreal, Quebec (CA)

( * ) Notice: Subject to any disclaimer, the term of this patent is extended or adjusted under 35 U.S.C. 154(b) by 386 days.

(21) Appl. No.: 13/816,096

(22) PCT Filed: Aug. 10, 2011

(86) PCT No.: PCT/CA2011/000911
§ 371 (c)(1),
(2), (4) Date: Apr. 8, 2013

(87) PCT Pub. No.: WO2012/019287
PCT Pub. Date: Feb. 16, 2012

(65) Prior Publication Data
US 2013/0206707 A1    Aug. 15, 2013

(30) Foreign Application Priority Data

Aug. 13, 2010    (AU) .................................. 2010903637
Aug. 20, 2010    (AU) .................................. 2010903743

(51) Int. Cl.
*B01D 21/18*        (2006.01)
*B01D 21/00*        (2006.01)
(Continued)

(52) U.S. Cl.
CPC .......... *B01D 21/0042* (2013.01); *B01D 21/183* (2013.01); *B01D 21/2461* (2013.01); *C01F 7/147* (2013.01); *C01F 7/148* (2013.01)

(58) Field of Classification Search
CPC ...... B01D 21/04; B01D 21/12; B01D 21/183; B01D 21/2461; C01F 7/147; C01F 7/148
USPC ................................ 210/803, 523, 524, 532.1
See application file for complete search history.

(56) References Cited

U.S. PATENT DOCUMENTS

| | | | | |
|---|---|---|---|---|
| 955,077 | A | * | 4/1910 | Janney .......................... 210/523 |
| 992,629 | A | * | 5/1911 | Akins ........................... 210/523 |

(Continued)

FOREIGN PATENT DOCUMENTS

| | | |
|---|---|---|
| GB | 847337 A | 9/1960 |
| WO | 8501040 A1 | 3/1985 |

(Continued)

OTHER PUBLICATIONS

International Search Report mailed Oct. 19, 2011 (PCT/CA2011/000911); ISA/CA.

(Continued)

*Primary Examiner* — Christopher Upton
(74) *Attorney, Agent, or Firm* — Banner & Witcoff, Ltd.

(57) ABSTRACT

An apparatus for refining a process liquor that includes solids, which apparatus includes a vessel having a base and a side wall that define an internal volume for containing the process liquor and for allowing gravity settling of the solids in the liquor, whereby to produce a refined liquor toward a top of the internal volume and a slurry toward a bottom of the internal volume, the apparatus further includes solids displacement elements disposed within the internal volume for directing settled solids and/or settling solids in the vicinity of the side wall or of the base toward a flow path of the slurry being extracted from the slurry outlet. A processing plant including the above refining apparatus and a method for refining a process liquor.

25 Claims, 5 Drawing Sheets

(51) Int. Cl.
  *B01D 21/24* (2006.01)
  *C01F 7/14* (2006.01)

(56) References Cited

U.S. PATENT DOCUMENTS

| | | | |
|---|---|---|---|
| 1,299,872 A | | 4/1919 | Traylor |
| 1,732,386 A | * | 10/1929 | Sprockhoff ................... 210/523 |
| 2,295,943 A | | 9/1942 | Finney |
| 2,868,384 A | * | 1/1959 | Puddington ................... 210/523 |
| 3,084,701 A | | 4/1963 | Hardy et al. |
| 3,923,652 A | | 12/1975 | Condolios et al. |
| 4,462,908 A | | 7/1984 | Eichler et al. |
| 5,676,827 A | * | 10/1997 | Bruke ........................... 210/523 |
| 7,473,376 B2 | | 1/2009 | Peloquin et al. |
| 8,075,785 B2 | * | 12/2011 | Dufrene et al. ............... 210/523 |
| 2003/0106860 A1 | * | 6/2003 | Peloquin et al. .............. 210/803 |
| 2006/0096935 A1 | * | 5/2006 | Harding ........................ 210/803 |
| 2007/0045202 A1 | * | 3/2007 | Peloquin et al. .............. 210/803 |

FOREIGN PATENT DOCUMENTS

| | | | |
|---|---|---|---|
| WO | WO 2008/121058 | * | 10/2008 |
| WO | 2010015738 A2 | | 2/2010 |

OTHER PUBLICATIONS

Jun. 14, 2014—(EP) Extended Search Report—App 11815952.4.
May 27, 2011—(AU) Search Report—App 2010903743.

* cited by examiner

APPARATUS AND METHOD FOR REFINING A PROCESS LIQUOR BY GRAVITY SETTLING

CROSS-REFERENCE TO RELATED APPLICATIONS

The present application is a U.S. National Phase filing of International Application No. PCT/CA2011/000911, filed on Aug. 10, 2011, designating the United States of America and claiming priority to Australian Patent Application No. 2010903637, filed Aug. 13, 2010, and Australian Patent Application No. 2010903743, filed Aug. 20, 2010, and the present application claims priority to and the benefit of all the above-identified applications, which are incorporated by reference herein in their entireties.

FIELD OF THE INVENTION

This invention relates to an apparatus and method for extracting solids from a process liquor and in particular to an apparatus and a method for extracting gravity settled solids, including precipitates, from a process liquor.

This invention has particular, although not exclusive, application to industrial processes for preparing viscous streams with solids, including a high volume of precipitated aluminium hydroxide in the course of producing alumina from bauxite by the Bayer process.

BACKGROUND

In the course of the Bayer process, aluminium hydroxide is precipitated from a process liquor by controlling process conditions associated with the liquor The precipitate settles at the bottom of a vessel referred to as a thickener and the process of causing precipitates to settle out of a liquor is referred to as thickening. The precipitates will be in the form of particles having a range of sizes, including some coarser and some finer sizes. The proportion of particles in the coarser and finer ranges of size depends on the process conditions.

Thickening results in liquor toward the bottom of the thickener being high in coarser precipitate content, and very viscous, and the liquor near the top of the vessel being very low in finer precipitate content. The process liquor may pass through a series of thickeners; some of which have the effect of separating coarse precipitates from fine precipitates and others substantially removing fine precipitates from the process liquor to create a so-called "clear liquor". The clear liquor is removed and subjected to further processing steps before being returned to the Bayer process as a caustic liquor used in digestion of bauxite.

Thickeners used to separate the coarse precipitate from the fine precipitate are referred to as classifiers. It will be appreciated that the term "thickener" as used herein after includes a reference to a classifier.

The viscous liquor (also termed a "slurry") is typically removed from the bottom of the thickener by pumping. However, the high viscosity of the slurry may cause a preferential flow path in the vicinity of the outlet of the thickener for the slurry. As a result, the solids outside the flow path settle and build-up within the thickener. The formed preferential flow path is termed a "rat-hole".

The effect of rat-holing is that the settled precipitate reduces the overall operational volume within the thickener. This means that process liquor has a shorter residence time in the thickener and, therefore, the viscous slurry extracted from the thickener has a precipitate content that is lower than desired for subsequent processing. This also causes an increase in the precipitate content and precipitate size in process liquor extract from near the top of the thickener, thus affecting negatively the performance of the subsequent processing steps.

Thickeners must, therefore, be shut-down and the settled precipitate cleaned out every two months on average in order to maintain suitable precipitate content in the extracted slurry.

Occasionally, settled precipitate will dislodge and fall into the preferential flow path so that the extracted slurry will have random spikes in precipitate content. This makes downstream processing difficult and necessitates additional control steps to ensure that precipitate content of the extracted slurry is reasonably consistent.

There is a need, therefore, to reduce "rat holes" and build-up of settled solids in thickeners. It will be appreciated that the term "solids" used throughout this specification includes precipitates.

SUMMARY OF THE DISCLOSURE

The applicant has recognised that the effects of rat-holing can be reduced by reintroducing settled and settling solids into the flow stream of highly viscous slurry exiting from the base of a thickener. In particular, the applicant has recognised that directing settled solids and highly viscous slurry near side walls of a thickener vessel into the vicinity of the flow path of slurry exiting the thickener vessel has the effect of reducing the extent to which solids build up around the side walls of a thickening vessel.

According to a first aspect, there is provided an apparatus for refining a process liquor that includes solids, which apparatus includes:
  (a) a vessel having a base and a side wall that define an internal volume for containing the process liquor and for allowing gravity settling of the solids in the liquor, whereby to produce a refined liquor toward a top of the internal volume and a slurry toward a bottom of the internal volume;
  (b) a refined liquor outlet at or near the top of the internal volume for extracting the low solids content clarified liquor;
  (c) a slurry outlet at or near the bottom of the internal volume for extracting the slurry unrestrictedly open to said internal volume; and
  (d) solids displacement elements extending across and fixed relative to the vessel, wherein the solids displacement elements are disposed within the internal volume, for directing settled solids and/or settling solids in the vicinity of the side wall or of the base toward a flow path of the slurry being extracted from the slurry outlet at or near the bottom of the internal volume.

The process liquor may be a Bayer process liquor containing precipitated aluminium hydroxide.

The solids displacement elements have a two-fold effect. Specifically, the solids displacement elements engage solids in the vicinity of the side walls or of the base and move the solids closer to the flow path of slurry being extracted from the vessel. These solids are therefore brought back into entrainment in the flow path and contribute to producing a thickened slurry that is extracted from the vessel. The thickened slurry, therefore, has a higher solids content than process liquors thickened without the solids displacement elements.

The solids displacement elements also have the effect of causing solids that have settled near a side wall or near the base of the vessel to move, such as by causing avalanches and cascades of the settled solids, from regions of high solids build-up to regions of low solids build-up. Such regions of low-solids build-up are regions where the slurry is advancing through the apparatus and exiting the vessel through the slurry outlet at or near the base of the vessel and, also, regions where the solids displacement elements engage the settled solids and bring them into the flow path of the slurry exiting the vessel.

The solids displacement elements have a further effect of agitating liquor in the regions in which the solids displacement elements are disposed so as to prevent settling of solids in those regions. This agitation is important for re-entraining previously settled solids back into the slurry. It is also important for ensuring that solids gravity settling out of the process liquor remain entrained with solids pulled back into entrainment after settling at the side walls and other regions of solids build-up.

Consequently, the solids displacement elements are not actually used for transporting or removing solids out of the vessel. Instead, the solids displacement elements are used for producing a thickened slurry having higher solids content, for causing solids that have settled near a side wall or near the base of the vessel to move and for agitating liquor in the regions in which said solids displacement elements are disposed.

In accordance to one aspect of the invention, the solids displacement elements are disposed for directing solids in the vicinity of the side wall or of the base toward a flow path of the slurry. In any cases including the case when the base of the vessel is not horizontal, the solids displacement elements can be disposed for directing solids in the vicinity of a wall of the vessel that is above the bottom of said vessel, either the side wall or the base, toward a flow path of the slurry.

In exemplary embodiments of the present invention, a portion of the solids in the vicinity of the side wall, i.e. the settled solids and/or settling solids, is physically engaged by the displacement elements. By the term "physically engaged" we mean that one or more parts of the displacement elements contact the portion of the solids in the vicinity of the side wall or of the base in such a way that the portion is moved in the vessel towards a flow path of the slurry being extracted from the slurry outlet, this flow path being oriented toward the base of the vessel.

The tops, at least one of the sides, preferably all sides, and more preferably the bottoms of the displacement elements are unshielded and exposed to the solid in the internal volume of the vessel. In other word, displacement elements are preferably unshielded, unconfined or not blocked by any other member in the internal volume of the vessel.

The displacement elements have preferably an elongated shape. The elongated displacement elements are preferably exposed, unshielded, unconfined or not blocked by any other member around said elements, at least over one part of the length of the element, preferably the majority the length, i.e. more than 50% of its length. This allows unconfined and unrestricted access of the slurry to the displacement elements at least along the majority of its length, within the vessel and preferably along its entire length within the vessel. The access to the displacement elements in this way should not encounter any constriction or choke points that cause bridging or blocking of the slurry flow as it advances into contact with the element. The slurry should therefore not be caused to pass through narrow openings before reaching the element from the interior of the vessel. Slurry of high viscosity will normally flow under the effects of gravity if there are no confining surfaces or articles to restrict the downward flow.

Preferably the slurry outlet is formed in the base of the vessel.

The slurry outlet is unrestrictedly open to the internal volume of the vessel. In other words, the slurry outlet is in open communication with the internal volume of the vessel and unshielded, unconfined or not blocked by any other member inside the internal volume of the vessel.

The solids displacement elements may be arranged to direct solids radially inwardly toward a flow path of slurry being extracted from the slurry outlet toward the base of the vessel. Preferably the slurry outlet at or near the base of the vessel is located centrally of the vessel.

The solids displacement elements may be rotatable screws. It is thought that the rotatable screws are efficient for directing solids without causing agitation at upper levels in the internal volume which might disturb gravity settling of solids from this region.

Accordingly, the solids displacement elements are preferably disposed in a lower region of the internal volume of the thickener vessel where solids build-up from settling solids typically occurs.

There may be at least one rotatable screw for directing solids toward a flow path of slurry being extracted from the slurry outlet. Alternatively, there may be at least two rotatable screws. In one particular form, there may be 4 rotatable screws, with each being arranged at about 90° to an adjacent rotatable screw. In another from, there may be sets of two rotatable screws parallel to each other, and optionally there may be two or more sets.

In either case, the rotatable screws are arranged such that solids are directed by the rotatable screws to a central region that coincides with the position of the flow path of the slurry leaving the vessel via the slurry outlet at or near the bottom of the vessel.

The rotatable screws may be formed with two or more sections and each section may be a different length. The screw in each section may have a different pitch and/or a different diameter.

Each rotatable screw may have a first section with a first diameter and/or a first pitch length and a second section with a second diameter and/or a second pitch length and wherein the first diameter and/or the first pitch length is smaller than the second diameter and/or second pitch length.

The first section may be adjacent the side wall of the apparatus.

The rotatable screws may be formed on respective cross-aligned shafts, each shaft may pass through the side wall and be coupled to a driver. The screw on a first end of the shaft may be opposite handed to the screw on the other end of the shaft. This allows two screws on a single shaft and rotating in the same direction to each transport material toward the centre of the vessel and away from the side wall of the vessel.

The driver may comprise an motor and a gear box for controlling rotation of the rotatable shafts. The motor may be electric or hydraulic.

The rotatable screws may be formed to provide a nominal throughput in the range of 50 to 200 m3/h each under normal operating conditions, but preferably 80 to 120 m3/h.

Preferably, the rotatable screws rotate at a speed and are sized so that they are able to transport toward the centre of the vessel solids in the range of 50% to 100% of the total solids exiting the vessel through the outlet at the base of the vessel. The rotatable screws may transport at least 70% of total solids exiting the vessel, but may transport at least 80% or even up to at least 90% of the total solids exiting the vessel.

The refined liquor may have a solids content in the range of 0 to 25 vol %.

The thickened slurry may have a solids content in the range of 10 to 60 vol %.

The apparatus may be a thickener vessel for thickening or classifying a process liquor in a Bayer process. The process liquor may be the product of a bauxite digestion step in the Bayer process. Accordingly, the thickener vessel may be for thickening or classifying a Bayer process liquor containing precipitated aluminium hydroxide. Refined liquor removed from the apparatus may be recycled to the bauxite digestion step.

In a second aspect, there is provided a processing plant including a refining apparatus according to the first aspect located in-situ in the plant, the apparatus (a) receiving an input stream of process liquor and (b) containing a refined liquor and a slurry, and wherein the refined liquor is extracted from a refined liquor outlet at or near the top of the apparatus and the slurry is extracted from a slurry outlet at or near the bottom of the apparatus.

The plant may further include:
(a) a reactor for contacting a feed material with a solution under conditions to produce a process liquor containing a valuable component and residual solids;
(b) a solid/liquid separator for removing the residual solids from the process liquor; and
(c) a recovery apparatus for recovering the valuable component from the slurry.

The plant may be a Bayer process plant in which the valuable component is an aluminium-bearing compound and in which the reactor digests bauxite to produce the process liquor which contains aluminium hydroxide in solution, the process liquor is subject to conditions to cause precipitation of aluminium hydroxide and the recovery apparatus treats the aluminium hydroxide to produce alumina.

In a third aspect, there is provided a method for refining a process liquor that includes solids by gravity settling the solids in a vessel having a base and side wall that define an internal volume, the method including the steps of:
(a) allowing solids in the process liquor to settle under gravity toward the base, thereby forming (i) a high solids-content slurry and a build-up of settled solids in a lower region of the internal volume and (ii) a refined liquor in an upper region of the internal volume;
(b) extracting the high solids-content slurry and the refined liquor from separate extraction points in the vessel; and
(c) operating solids displacement elements extending across and fixed relative to the vessel, for directing settled solids and/or settling solids in the vicinity of the side wall or the base toward a flow path of the high solids-content slurry being extracted from the vessel.

The refining method may be a method for thickening or classifying process liquor in a Bayer process. The process liquor may be the product of a bauxite digestion step in the Bayer process. Accordingly, the method may be for thickening or classifying a Bayer process liquor containing precipitated aluminium hydroxide. Clarified liquor removed from the vessel may be recycled to the bauxite digestion step.

The solids displacement elements may be in the form described above in respect of the first aspect.

The solids displacement elements may be operated to provide a nominal throughput of 50 to 100% of the underflow capacity of the vessel under normal operating conditions. The solids displacement elements may be operated to provide a nominal throughput in the range of 50 to 450 m3/h, preferably of 50 to 200 m3/h, each under normal operating conditions, but preferably 80 to 120 m3/h each.

Step (c) may comprise controlling the solids displacement elements to enable the method to operate continuously.

Step (c) may further comprise controlling operation of the solids displacement elements to operate the method under normal operating conditions continuously for at least two months, and more preferably at least three months.

The method may further comprise supplying the process liquor to the vessel. The process liquor may be a refined process liquor.

The method may further comprise a step of conditioning the process liquor to cause precipitation of the solids either before and/or after the liquor is supplied to the vessel.

BRIEF DESCRIPTION OF THE DRAWINGS

Embodiments will now be described by reference to an example of an apparatus shown in the accompanying drawings, in which.

DETAILED DESCRIPTION

Gravity classifiers and gravity settling equipment are typically used in hydrometallurgical processes to separate solids from process liquors. An example is the Bayer process which typically uses such equipment to separate aluminium hydroxide from process liquor. Although the invention has a range of applications, including thickening and classifying process liquors, the following description relates to thickening of a Bayer process liquor and producing a low-solids content clarified liquor. This should not be taken as limiting application of the invention to thickening.

Figure 1:
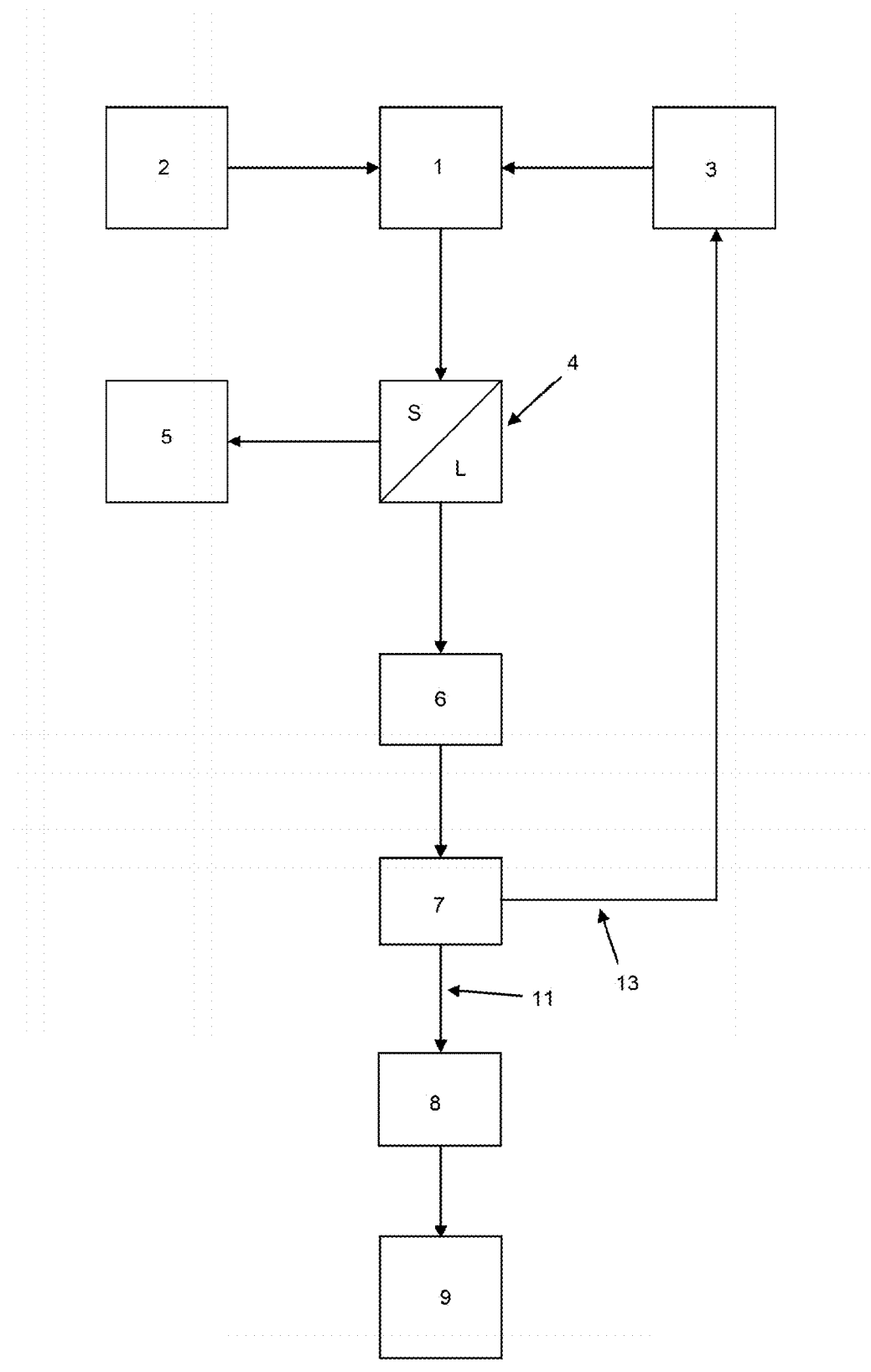
FIG. 1 is a schematic flow chart of the Bayer process.

A Bayer process for producing alumina from bauxite is shown generally in FIG. 1.

The Bayer process, generally speaking, involves a reactor 1 being supplied with crushed bauxite 3 and a solvent 2, typically caustic solution at elevated temperature. The solvent 2 selectively dissolves aluminium-bearing compounds to produce a process liquor loaded with aluminium in the form of aluminium hydroxide. The remainder of the bauxite does not dissolve and instead forms a fine "red mud" 5 which is separated from the process liquor at a solids/liquid separation step 4, typically a multi-stage gravity settling apparatus.

The process liquor is then passed to a precipitator vessel 6, where it is conditioned to cause aluminium hydroxide to precipitate as a solid. The process liquor or slurry 11 is then passed to a thickener apparatus 7 and clarified liquor 13 said thickener apparatus is recycled to the crushed bauxite 3. The thickener apparatus 7 allows the aluminium hydroxide to settle under gravity to form a slurry 11 having a relatively high solids-content. The slurry 11 is extracted from the thickener apparatus 7. Settling of the solids leaves a clarified liquor near the top of the thickener apparatus 7 which is extracted and processed so that it can be recycled to the reactor 1 as at least part of the solvent 2.

The slurry from the thickener apparatus 7 is subject to further processing to separate solid aluminium hydroxide from the slurry. The solids are then calcined in a kiln 8 at around 1050° C. to cause aluminium hydroxide to decompose to alumina 9 (solids) and water vapour. The alumina may then be used as a feedstock in a separate process for smelting alumina to produce aluminium metal.

Figure 2:
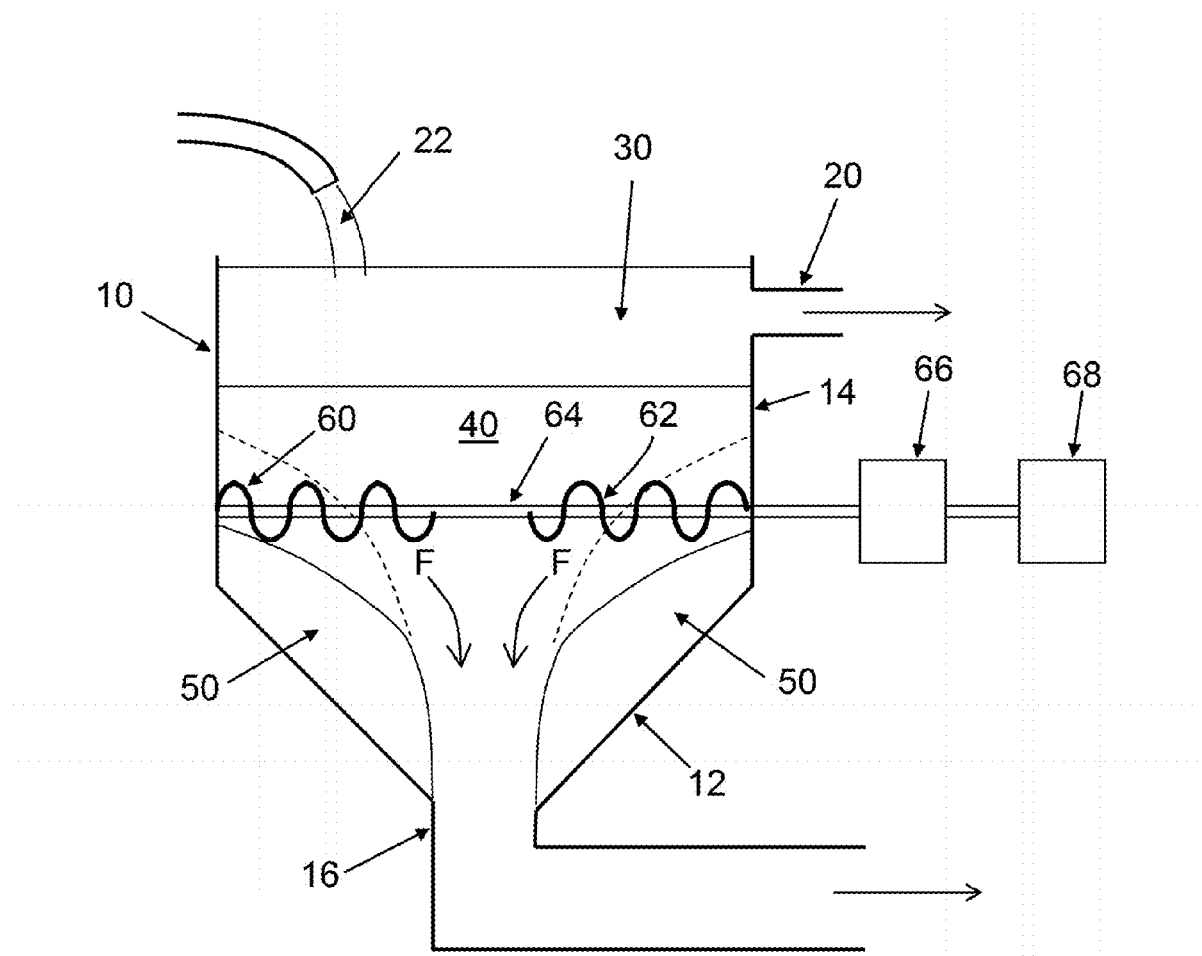
FIG. 2 is a schematic cross-section of an embodiment of a thickener vessel.

According to an embodiment of the invention the thickener apparatus 7 is formed as vessel 10 in FIG. 2.

The vessel 10 has a base 12 with an inverted frusto-conical shape from which a sidewall 14 extends upwardly to define collectively an internal volume for receiving an input liquid in the form of a process liquor 22 and for allowing the process liquor 22 to thicken by a gravity settling of suspended solids. The term "process liquor" is used hereinafter to denote a liquid that contains solids, which in the case of the Bayer process may be precipitates of aluminium hydroxide.

A thickened slurry is removed via slurry outlet, in the form of an extraction port 16, formed in the base 12. Extraction of the thickened slurry causes a flow stream designated by arrows marked F inside the internal volume. The extracted high solids-content slurry is subjected to further processing, for example to further separate the solids from the process liquor remaining in the slurry.

As the solids settle out of the process liquor, a clarified liquor 30 forms at an upper region of the vessel 10 and is extracted via a liquor outlet, in the form of a clarified liquor port 20, for subsequent processing downstream, for example, to recover and recycle caustic for re-use in the Bayer process or recover and recycle other solvents in alternative hydrometallurgical processes.

The process liquor 22 in the vessel 10 includes solids that are very fine, typically having a median solid particulate size in the range of 95 to 105 µm. These solids therefore, behave as clay-like materials when settled. As the solids are settling under gravity, the conditions inside the vessel 10 are relatively quiescent. This causes the solids settling on the base 12 to form a layer 50.

The flow stream F for the slurry is maintained where the thickened slurry, i.e. the high solids-content slurry, continues to flow through the vessel 10 and out via the slurry extraction port 16.

In operation, should a build-up of a layer 50 of solids on the base 12 occur, it will reduce the operating internal volume of the vessel 10 and so reduce the extent to which process liquor can be processed in the vessel 10. In effect, the residence time of input process liquor 22 in the internal volume is reduced so that the slurry extracted via the slurry extraction port 16 has variable solids content and may typically be much lower than desired.

To counteract this effect, the vessel 10 includes screws 60 which comprise helical vanes 62 on a shaft 64. The shaft 64 extends across the diameter of the vessel 10 and out the side wall 14. The shaft 64 is driven by a gearbox 66 which is coupled to an electric motor 68 to control rotation of the shaft 64 and hence the screws 60. The vanes 62 of the screws 60 extend from close proximity to the sidewall 14 to a central region in the internal volume that coincides with the flow stream F of high solids-content slurry.

Accordingly, the screws 60 direct solids in the layer 50, that has built up on the base 12 and sidewall 14 of the vessel, into a central region of the vessel 10 which coincides with the flow stream F. Accordingly, the solids are directed radially inwardly toward the flow stream F so that the flow stream F is supplied with solids to facilitate forming a high solids-content slurry.

In the absence of the screws 60, it is typical for the layer 50 to build up to the extent shown by the dashed lines in FIG. 2.

FIG. 2 shows in schematic form a demarcation between the clarified liquor 30 and the slurry 40. However, the solids concentration in the vessel typically increases with the depth in the vessel so that at the upper surface of the liquid in the vessel 10, the solids have almost completely settled out of the process liquor leaving a clarified liquor 30. Nevertheless, it can be seen that with a build up of solids in layer 50 to the extent of the dash lines, the usable volume in the vessel is significantly reduced. The screws 60 reduce this build up and ensure that despite continuous use, the usable volume is substantially maintained. This has an important effect in that the campaign life of the vessel 10 is increased beyond two months and generally is at least three months, depending on the size of the vessel 10, before maintenance is required to clear the layer 50.

Figure 3A:
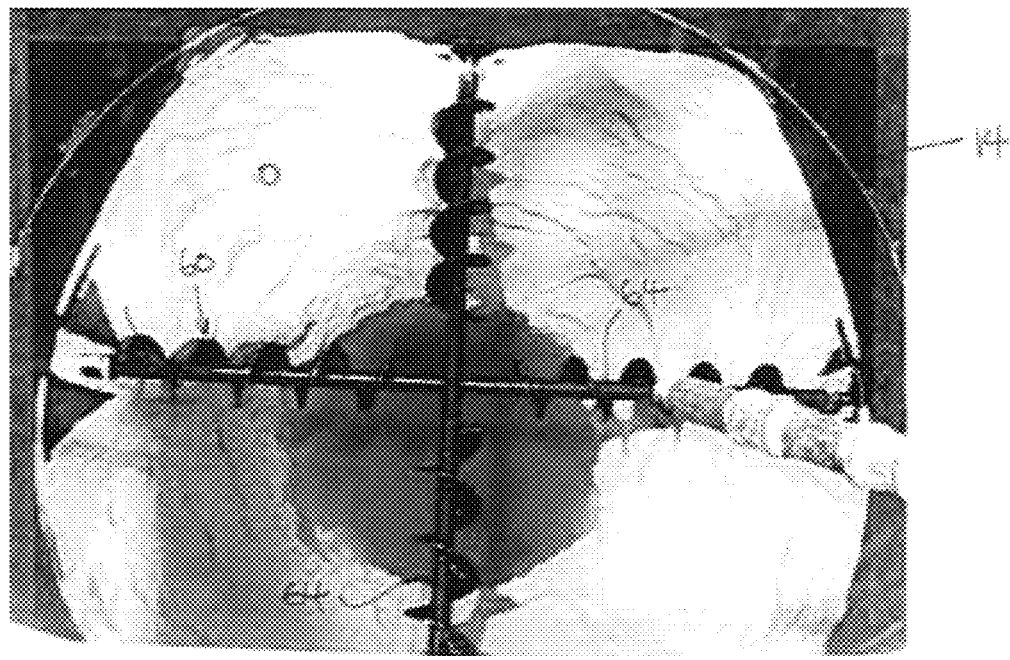
FIG. 3A is a photograph of a partially drained thickener vessel of the form shown in FIG. 2 after operation of the apparatus to thicken process liquor.
Figure 3B:
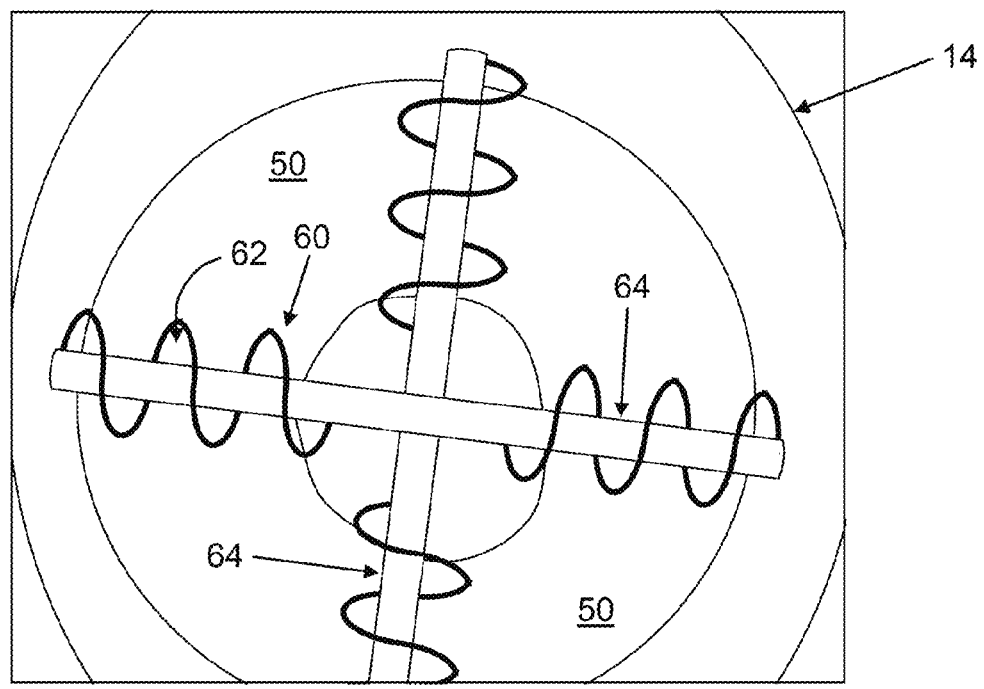
FIG. 3B is a drawing corresponding to the photograph of FIG. 3A.
Figure 4A:
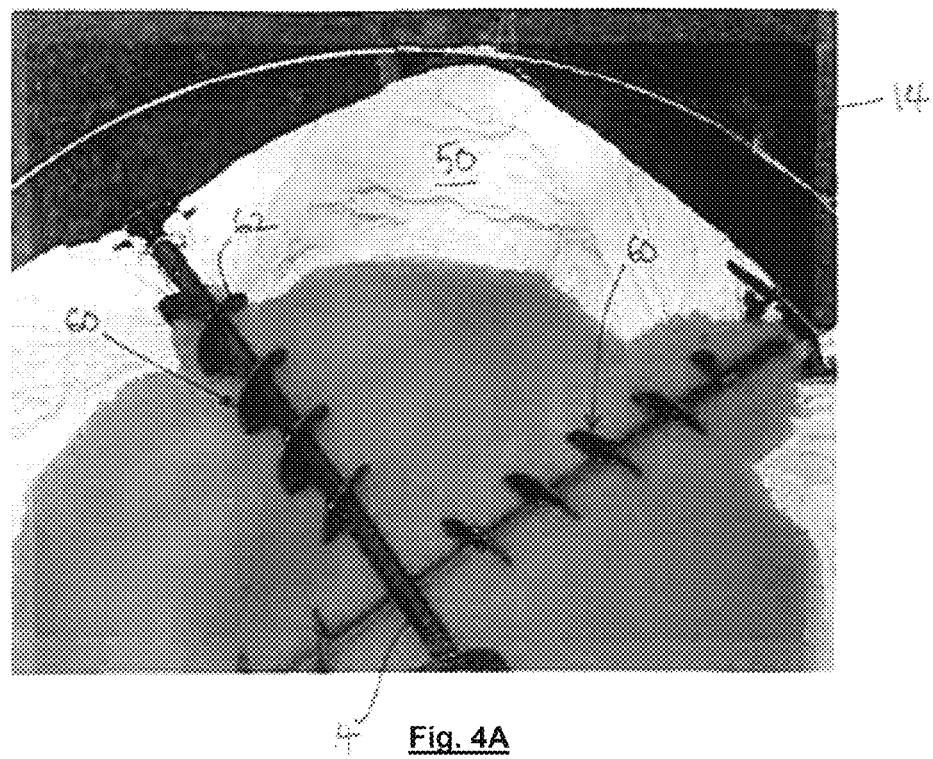
FIG. 4A is also a photograph showing a partially drained thickener vessel of the form shown in FIG. 2 after operation of the apparatus to thicken process liquor.
Figure 4B:
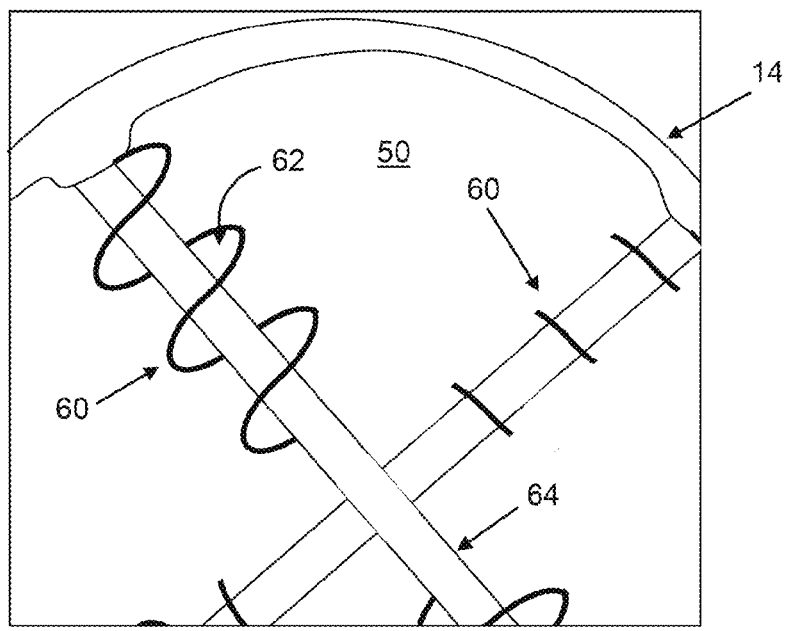
FIG. 4B is a drawing corresponding to the photograph of FIG. 4A.

The reduction in the layer 50 build-up in the vicinity of the screws 60 is best seen in FIGS. 3 and 4. Specifically with reference to FIG. 4, the level of solids is clearly higher on the sidewall 14 of the vessel 10 in the region away from the screws 60 in comparison to the level of solids in the vicinity of the screws 60.

Figure 5:
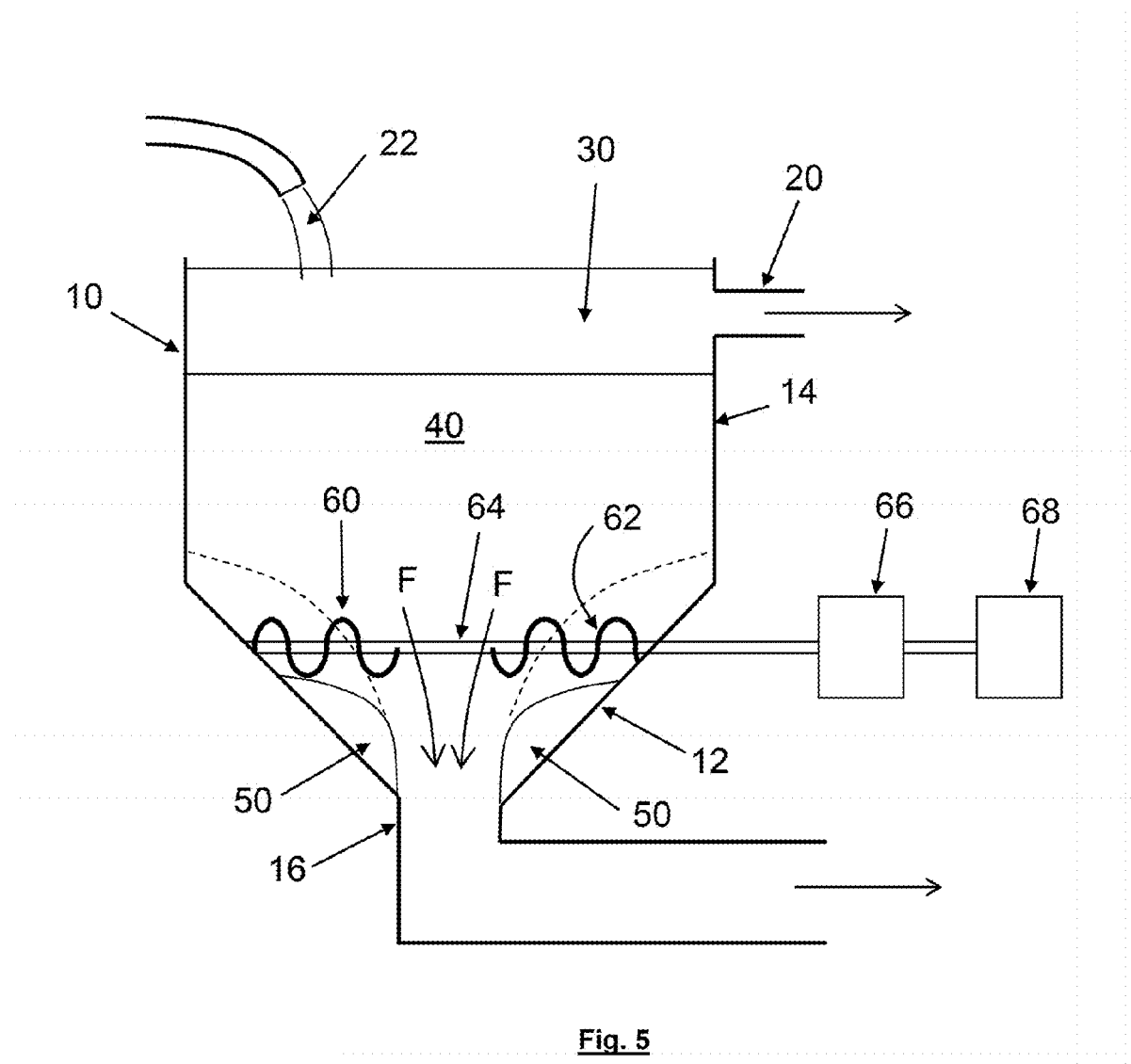
FIG. 5 is a schematic cross-section of another embodiment of a thickener vessel.

Alternatively, the screws 60 can be installed through the conical base 12 as shown on FIG. 5.

Without wishing to be held to any particular theory, the applicant believes that the screws 60 transport solids in the layer 50 toward a central region of the vessel which coincides with the flow stream F of high solids-content slurry. Although the layer 50 may continue to build up in regions away from the screws 60, the layer 50 of solids is destabilized by the difference in build-up and will typically fall as an avalanche or cascade of solids towards the screws 60 or towards the central region of the vessel.

It is also believed that the screws provide sufficient agitation to keep solids entrained in the flow of solids exiting the vessel in their vicinity and thereby enable high solids-content slurry to be transferred from the sidewalls 14 into the flow stream F.

The apparatus includes four rotatable screws 60 disposed at right angles at a lower region of the vessel 10 and typically where the solids form layer 50. In this configuration, the screws direct solids radially inwardly toward the central region. It is anticipated however that alternative configurations may be adopted when more than four or less than four screws 60 are utilized in a vessel 10. It is preferred, nevertheless, to space the screws 60 equidistantly about the vessel 10 to even out build-up of layer 50 and to prolong time between maintenance clean out.

With reference to FIG. 3, two screws 60 are formed on one shaft 54 and the remaining two screws are formed on another shaft 64. The shafts 64 are disposed orthogonally, but are vertically separated to avoid interference.

Mounting fixtures on the inside of the sidewall 14 are provided to fix each shaft 64 relative to the vessel 10 and yet enable rotation of the shafts. The screws on either end of the shaft 64 are opposite handed so that each screw moves solids away from the side wall and towards the flow stream F, typically in the centre of the vessel.

In practice in a vessel 10 having an internal diameter of about 7.3 m, the screws 60 are rotated at 7.5 rpm by the electric motor 68 and the gear box 66. Each screw has a diameter of 450 to 550 mm in a first section adjacent the side wall 14 and a diameter of 550 to 650 mm in a second section that is inboard of the first section. The first section is about 1.5 m long and the pitch of the vanes 62 is 400 to 500 mm. The second section is about 1.1 m long and the pitch of the vanes 62 is 500 to 650 mm.

Each screw 60 is of a type having a leading edge which cuts into solids in layer 50 causing them to be drawn into and transported along the length of the screw 60. Where the screw 60 changes diameter, there is an additional leading edge which gathers additional solids into the additional volume of the screw transportation path and also directs these additional solids toward the centre of the vessel 10.

Based on the above figures, the screws 60 each have a nominal throughput of 100 m3/h. It will be appreciated, however, that the length, pitch and diameter of the screws may be selected to provide required solids transfer depending on the diameter of the vessel 10 and the nature of the solids in the slurry.

Preliminary test work demonstrates that a vessel 10 without screws 60 produces an underflow with a solids concentration of 600-850 gpl (i.e. 24.8 to 35.1 vol % solids). By contrast, the same vessel 10 fitted with screws 60 as shown in FIGS. 3 and 4 produces an underflow with a solids concentration of 1050-1150 gpl (i.e. 43.4 to 47.5 vol % solids). It will be appreciated that these results were obtained under laboratory scale test conditions and the actual solids concentration under normal plant conditions may be less. It is expected, however, that use of the screws 60 will provide a significant improvement in solids concentration from thickener vessels 10.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Many modifications may be made to the preferred embodiment of the present invention as described above without departing from the spirit and scope of the present invention.

The invention claimed is:

1. An apparatus for refining a process liquor that includes solids, which apparatus includes:
   (a) a vessel having a base and a side wall that define an internal volume for containing the process liquor and for allowing gravity settling of the solids in the liquor, whereby to produce a refined liquor toward a top of the internal volume and a slurry toward a bottom of the internal volume;
   (b) a refined liquor outlet at or near the top of the internal volume for extracting the refined liquor;
   (c) a slurry outlet at or near the bottom of the internal volume for extracting the slurry, unrestrictedly open to said internal volume; and
   (d) solids displacement elements extending across and fixed relative to the vessel, wherein the solids displacement elements are disposed within the internal volume for directing settled solids and/or settling solids in the vicinity of the side wall or of the base toward a flow path of the slurry being extracted from the slurry outlet.

2. An apparatus according to claim 1, wherein said apparatus is configured for refining the process liquor in the form of a Bayer process liquor containing precipitated aluminium hydroxide.

3. An apparatus according to claim 1, wherein the solids displacement elements are disposed for directing solids in the vicinity of a wall of the vessel above the bottom of said vessel toward the flow path of the slurry being extracted from the slurry outlet.

4. An apparatus according to claim 1, wherein the solids displacement elements are arranged to direct settled solids and/or settling solids radially inwardly toward the flow path of the slurry.

5. An apparatus according to claim 1, wherein the slurry outlet is formed in the base.

6. An apparatus according to claim 1, wherein the slurry outlet is located centrally of the vessel.

7. An apparatus according to claim 1, wherein the solids displacement elements are disposed in a lower region of the internal volume of the vessel.

8. An apparatus according to claim 1, wherein the solids displacement elements are unshielded at a top and at least one side of each solids displacement element.

9. An apparatus according to claim 1, wherein the solids displacement elements are unshielded, unconfined or not blocked by any other member in the internal volume of the vessel.

10. An apparatus according to claim 1, wherein the solids displacement elements comprise at least one rotatable screw.

11. An apparatus according to claim 10, wherein the solids displacement elements comprise at least two rotatable screws.

12. An apparatus according to claim 11, wherein the solids displacement elements comprise four rotatable screws, with each being arranged at about 90° to an adjacent rotatable screw.

13. An apparatus according to claim 11, wherein the solids displacement elements comprise sets of two rotatable screws parallel to each other.

14. An apparatus according to claim 10, wherein the at least one rotatable screw is arranged such that solids are directed by the rotatable screw to a central region that coincides with a position of the flow path.

15. An apparatus according to claim 10, wherein the at least one rotatable screw is formed with two or more sections of different length, different pitch and/or different diameter.

16. An apparatus according to claim 15, wherein each rotatable screw has a first section with a first diameter and/or a first pitch length and a second section with a second diameter and/or a second pitch length and wherein the first diameter and/or the first pitch length is smaller than the second diameter and/or second pitch length.

17. An apparatus according to claim 16, wherein the first section is adjacent the side wall or the bottom of the apparatus.

18. An apparatus according to claim 10, wherein each rotatable screw is formed on respective cross-aligned shafts, each shaft being passed through the side wall and being coupled to a driver.

19. An apparatus according to claim 18, wherein the screw on a first end of the shaft is opposite handed to the screw on the other end of the shaft.

20. An apparatus according to claim 1, wherein said apparatus is a thickener vessel for thickening or classifying the process liquor in a Bayer process.

21. An apparatus according to claim 20, wherein said apparatus is configured for refining the process liquor in the form of a product of a bauxite digestion step in the Bayer process.

22. A processing plant comprising a refining apparatus according to claim 1 located in-situ in the plant, the apparatus (a) receiving an input steam of process liquor and (b) containing a refined liquor and a slurry, and wherein the refined liquor is extracted from a refined liquid outlet at or near the top of the apparatus and the slurry is extracted from a slurry outlet at or near the bottom of the apparatus.

23. A method for refining a process liquor that includes solids by gravity settling the solids in a vessel having a base and side wall that define an internal volume, the method comprising:
   (a) allowing solids in the process liquor to settle under gravity toward the base, thereby forming (i) a high solids-content slurry and a build-up of settled solids in a lower region of the internal volume and (ii) a refined liquor in an upper region of the internal volume;
(b) extracting the high solids-content slurry and the refined liquor from separate extraction points in the vessel, the separate extraction points comprising a refined liquor outlet at or near the top of the internal volume for extracting the refined liquor and a slurry outlet at or near the bottom of the internal volume for extracting the slurry, wherein the slurry outlet is unrestrictedly open to said internal volume; and
(c) operating solids displacement elements extending across and fixed relative to the vessel, for directing settled solids and/or settling solids in the vicinity of the side wall or of the base toward a flow path of high solids-content slurry being extracted from the vessel through the slurry outlet.

24. A method according to claim 23, wherein the process liquor is a Bayer process liquor containing precipitated aluminium hydroxide.

25. An apparatus for refining a process liquor that includes solids, which apparatus includes:
(a) a vessel having a side wall and a base extending downwardly and inwardly from the side wall to a bottom of the vessel, the side wall and the base defining an internal volume for containing the process liquor and for allowing gravity settling of the solids in the liquor, whereby to produce a refined liquor toward a top of the internal volume and a slurry toward the bottom of the internal volume;
(b) a refined liquor outlet at or near the top of the internal volume for extracting the refined liquor;
(c) a slurry outlet at or near the bottom of the internal volume for extracting the slurry, unrestrictedly open to said internal volume, wherein the apparatus is configured such that the slurry follows a downward flow path through the internal volume to the slurry outlet; and
(d) solids displacement elements connected to at least one of the side wall and the base and extending across and fixed relative to the vessel, wherein the solids displacement elements are disposed within the internal volume and spaced upwardly from the bottom of the internal volume, for directing settled solids and/or settling solids in the vicinity of the side wall or of the base toward the flow path of the slurry being extracted from the slurry outlet.

* * * * *